United States Patent
Cho

(10) Patent No.: US 6,212,170 B1
(45) Date of Patent: Apr. 3, 2001

(54) METHOD FOR MANAGING STATUS AND DUAL INFORMATION OF CLOCK DISTRIBUTOR

(75) Inventor: Beom-Soo Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/031,165

(22) Filed: Feb. 26, 1998

(30) Foreign Application Priority Data

Feb. 26, 1997 (KR) ............................................. 97/5896

(51) Int. Cl.[7] ............................... H04L 12/28; H04J 1/16
(52) U.S. Cl. ......................... 370/254; 710/102; 710/117; 370/241
(58) Field of Search ..................................... 370/350, 335, 370/503, 342, 254, 451, 458, 241; 375/200, 357, 356, 140, 145; 710/100, 101, 102, 104, 109, 117; 714/1, 25, 30; 709/223, 224

(56) References Cited

U.S. PATENT DOCUMENTS

| 5,091,904 | * | 2/1992 | Back et al. ............................ 370/220 |
| 5,708,657 | * | 1/1998 | Hong et al. ........................... 370/335 |
| 5,887,248 | * | 3/1999 | Ahn et al. ............................. 455/321 |
| 5,973,640 | * | 10/1999 | Lee .................................... 342/357.1 |

* cited by examiner

Primary Examiner—David R. Vincent
(74) Attorney, Agent, or Firm—Dilworth & Barrese, LLP

(57) ABSTRACT

A control device manages status and dual information of respective boards in a clock distributor for use in a CDMA base station controller. The device forms a TD-bus communication path and an address map for TD-bus communication, so as to manage the status and dual information of the respective boards in the clock distributor. The device periodically checks installation/uninstallation, normality/abnormality, and dual status of the respective boards in the clock distributor through the TD-bus communication using the address map, and reports changed status information to an operator.

15 Claims, 11 Drawing Sheets

| | | | | |
|---|---|---|---|---|
| 0xc20000 (APORT_0) | A-PORT REGION(64K) | | 0xc20000 (APORT_0) | C-PORT REGION(64K) |
| 0xc30000 (BPORT_0) | B-PORT REGION(64K) | | 0xc30000 (BPORT_0) | D-PORT REGION(64K) |
| 0xc40000 (ARDR_0) | A-PORT READ | | 0xc40000 (ARDR_0) | C-PORT READ |
| 0xc50000 (BRDR_0) | B-PORT READ | | 0xc50000 (BRDR_0) | D-PORT READ |
| 0xc70000 (ASR_0) | A-PORT STATUS | | 0xc70000 (ASR_0) | C-PORT STATUS |
| 0xc70001 (BSR_0) | B-PORT STATUS | | 0xc70001 (BSR_0) | D-PORT STATUS |
| 0xc7ff70 | A/B TEST | | 0xc7ff70 | C/D TEST |
| 0xc7ff80 (AMFP_0) | A MODE SELECTION | | 0xc7ff80 (AMFP_0) | C MODE SELECTION |
| 0xc7ff81 (BMFP_0) | B MODE SELECTION | | 0xc7ff81 (BMFP_0) | D MODE SELECTION |
| 0xc7ff82 (INTR_0) | INTERRUPT MASK | | 0xc7ff82 (INTR_0) | INTERRUPT MASK |
| 0xc7ff83 (OTH_0) | TD BUS SELECTION READ | | 0xc7ff83 (OTH_0) | TD BUS SELECTION READ |
| 0xc7ff84 (TBS_0) | TD BUS PORT SELECTION | | 0xc7ff84 (TBS_0) | TD BUS PORT SELECTION |
| 0xc7ff85 (VBR_0) | INTERRUPT VECTOR | | 0xc7ff85 (VBR_0) | INTERRUPT VECTOR |
| 0xc7ff86 | NONUSE | | 0xc7ff86 | NONUSE |

FIG. 4

| MODE | FUNCTION |
|---|---|
| 0 | READ AFTER SKGA WRITE |
| 1 | SKGA STATUS READ |
| 2 | SKGA DUAL STATUS CONTROL |
| 3 | RESERVED |
| 4 | READ AFTER SKGA WRITE |
| 5 | SKGA STATUS READ |
| 6 | SKGA DUAL STATUS CONTROL |
| 7-15 | RESERVED |

FIG. 5

MODE 0 (READ AFTER SKGA WRITE)

| BIT | VALUE | FUNCTION |
|---|---|---|
| A15 | 0 | SKGA A SIDE |
| | 1 | SKGA B SIDE |
| A14-A1 | X | CON'T CARE |
| A0 | 0 | WRITE INTO SKGA REGISTER |
| | 1 | READ FROM SKGA REGISTER |

FIG. 6

MODE 1 (SKGA STATUS READ)-ADDRESS

| BIT | VALUE | FUNCTION |
|---|---|---|
| A15 | 0 | SKGA A SIDE |
|  | 1 | SKGA B SIDE |
| A14-A0 | X | DON'T CARE |

FIG. 7A

MODE 1 (SKGA STATUS MODE) - DATA

| BIT | FUNCTION |
|---|---|
| D7 | SACT ('0'=ACTIVE) |
| D6 | SPLLF ('1'=PLL FAIL) |
| D5 | SGPSAFAIL ('1'=GPS A FAIL) |
| D4 | SGPSAFAIL ('1'=GPS B FAIL) |
| D3 | SGPSEL ('0'=GPS A SELECTION) |
| D2 | OFAIL ('1'= ANOTHER SIDE PBA FAIL) |
| D1 | OOPEN ('1'= ANOTHER SIDE PBA OPEN) |
| D0 | ACTIVE ('0'= ANOTHER SIDE PBA ACTIVE) |

FIG. 7B

MODE 2 (OPERATION AND WAITING STATUS CHANGE)

| BIT | VALUE | FUNCTION |
|---|---|---|
| A15 | 0 | SKGA A SIDE |
| A15 | 1 | SKGA B SIDE |
| A14–A1 | X | DON'T CARE |
| A0 | 0 | SWITCH TO OPERATION STATUS |
| A0 | 1 | SWITCH TO WAITING STATUS |

FIG. 8

MODE 4 (READ AFTER SKDA WRITE)

| BIT | VALUE | FUNCTION |
|---|---|---|
| A15 | 0 | SKGA A SIDE |
| | 1 | SKGA B SIDE |
| A14–A4 | X | DON'T CARE |
| A3–A1 | 0 | SKDA 0 |
| A3–A1 | 1 | SKDA 1 |
| | 2 | SKDA 2 |
| | 3 | SKDA 3 |
| | 4 | SKDA 4 |
| | 5 | SKDA 5 |
| | 6–7 | NOT USED |
| A0 | 0 | WRITE INTO SKDA REGISTER |
| | 1 | READ FROM SKDA REGISTER |

FIG. 9

MODE 5 (SKDA STATUS READ)—ADDRESS

| BIT | VALUE | FUNCTION |
|---|---|---|
| A15 | 0 | SKGA A SIDE |
|  | 1 | SKGA B SIDE |
| A14–A4 | X | DON'T CARE |
| A3–A1 | 0 | SKDA 0 |
|  | 1 | SKDA 1 |
|  | 2 | SKDA 2 |
|  | 3 | SKDA 3 |
|  | 4 | SKDA 4 |
|  | 5 | SKDA 5 |
|  | 6–7 | NONUSE |
| A0 | X | DON'T CARE |

FIG. 10A

MODE 5 (SKDA STATUS READ)-DATA

| BIT | FUNCTION |
|---|---|
| D7 | SACT ('0'=ACTIVE) |
| D6 | SPLLF ('1'=PLL FAIL) |
| D5 | 0 |
| D4 | 0 |
| D3 | 0 |
| D2 | OFAIL ('1'= ANOTHER SIDE PBA FAIL) |
| D1 | OOPEN ('1'= ANOTHER SIDE PBA OPEN) |
| D0 | ACTIVE ('0'= ANOTHER SIDE PBA ACTIVE) |

FIG. 10B

MODE 6 (SKDA OPERATION AND WATING STATUS CHANGE)

| BIT | VALUE | FUNCTION |
|---|---|---|
| A15 | 0 | SKGA A SIDE |
| A15 | 1 | SKGA B SIDE |
| A14−A4 | X | DON'T CARE |
| A3−A1 | 0 | SKDA 0 |
| A3−A1 | 1 | SKDA 1 |
| A3−A1 | 2 | SKDA 2 |
| A3−A1 | 3 | SKDA 3 |
| A3−A1 | 4 | SKDA 4 |
| A3−A1 | 5 | SKDA 5 |
| A3−A1 | 6−7 | NONUSE |
| A0 | 0 | SWITCH TO OPERATION STATUS |
| A0 | 1 | SWITCH TO WAITING STATUS |

FIG. 11

METHOD FOR MANAGING STATUS AND DUAL INFORMATION OF CLOCK DISTRIBUTOR

BACKGROUND OF THE INVENTION

1. Field of the Invention

The present invention relates to a CDMA (Code Division Multiple Access) base station controller (BSC), and more particularly to a method for managing status and dual information of a clock distributor for use in a base station controller.

2. Description of the Related Art

A CDMA base station controller includes communication equipment, which should be synchronized with a reference clock received from a satellite. For example, such communication equipment are a link device between a base station controller BSC and a mobile switching center MSC, a link device between the base station controller BSC and a base station transceiver BTS, and a vocoder. A clock distributor CKD generates and distributes a stable clock signal to such equipment.

Referring to FIG. 1, the clock distributor CKD includes a pair of global positioning systems GPS (A) and (B) for receiving signals from the satellite, two pairs of system clock generator assemblies SKGA for generating various kinds of system clocks according to the reference clock, and twelve pairs of system clock distributor assemblies SKDA for distributing the system clocks into a plurality of clock sources. The clock distributor is commonly formed into a board.

Such clock distributors CKD operate in pairs, and a status of the clock distributor CKD is managed by an alarm control interface processor ACP. The alarm control interface processor ACP detects a failure of respective boards in the clock distributor CKD, to manage the status of the clock distributor CKD. However, the prior art alarm control interface processor ACP can only manage an installation/uninstallation status and a normal/abnormal status of the clock distributor CKD. That is, the alarm control interface processor ACP may not properly manage the status of the respective dual boards in the clock distributor CKD. Thus, it is desirable to be able to manage the status (operation/waiting status) of the respective sides, and report to an operator the proper information when the clock distributor CKD is switched due to an abnormality of an operation party.

SUMMARY OF THE INVENTION

It is therefore an object of the present invention to provide a method for managing status and dual information of a clock distributor in a base station controller.

It is another object of the present invention to provide a method for notifying an operator as to the status and dual management information of respective sides of a clock distributor in a base station controller.

It is still another object of the present invention to provide a method for managing dual information of respective boards in a clock distributor by periodically scanning status registers of the boards.

According to an aspect of the present invention, a method for managing status and dual information of respective boards in a clock distributor for use in a CDMA base station controller includes the steps of forming a telephone device-bus TD-bus communication path and an address map for the TD-bus communication, so as to manage the status and dual information of the respective boards in the clock distributor; periodically checking installation/uninstallation, normality/abnormality, and dual status of the respective boards in the clock distributor through the TD-bus communication using the address map; and reporting changed status information to an upper board.

BRIEF DESCRIPTION OF THE DRAWINGS

The above and other objects, features and advantages of the present invention will become more apparent in the light of the following detailed description of an exemplary embodiment thereof taken with the attached drawings in which:

FIG. 4 is a diagram for showing an address map programmed in the alarm control interface processor ACP for interfacing with the TD-bus;

FIG. 5 is a diagram for showing the operation modes and corresponding functions of the TD-bus according to an embodiment of the invention;

FIG. 6 is a diagram for showing an address bit status for a mode 0;

FIG. 7a is a diagram for showing an address bit status for a mode 1;

FIG. 7b is a diagram for showing a data bit status for the mode 1;

FIG. 8 is a diagram for showing an address bit status for a mode 2;

FIG. 9 is a diagram for showing an address bit status for a mode 4;

FIG. 10a is a diagram for showing an address bit status for a mode 5;

FIG. 10b is a diagram for showing a data bit status for the mode 5;

FIG. 11 is a diagram for showing an address bit status for a mode 6; and

DETAILED DESCRIPTION OF PREFERRED EMBODIMENTS

Figure 1:
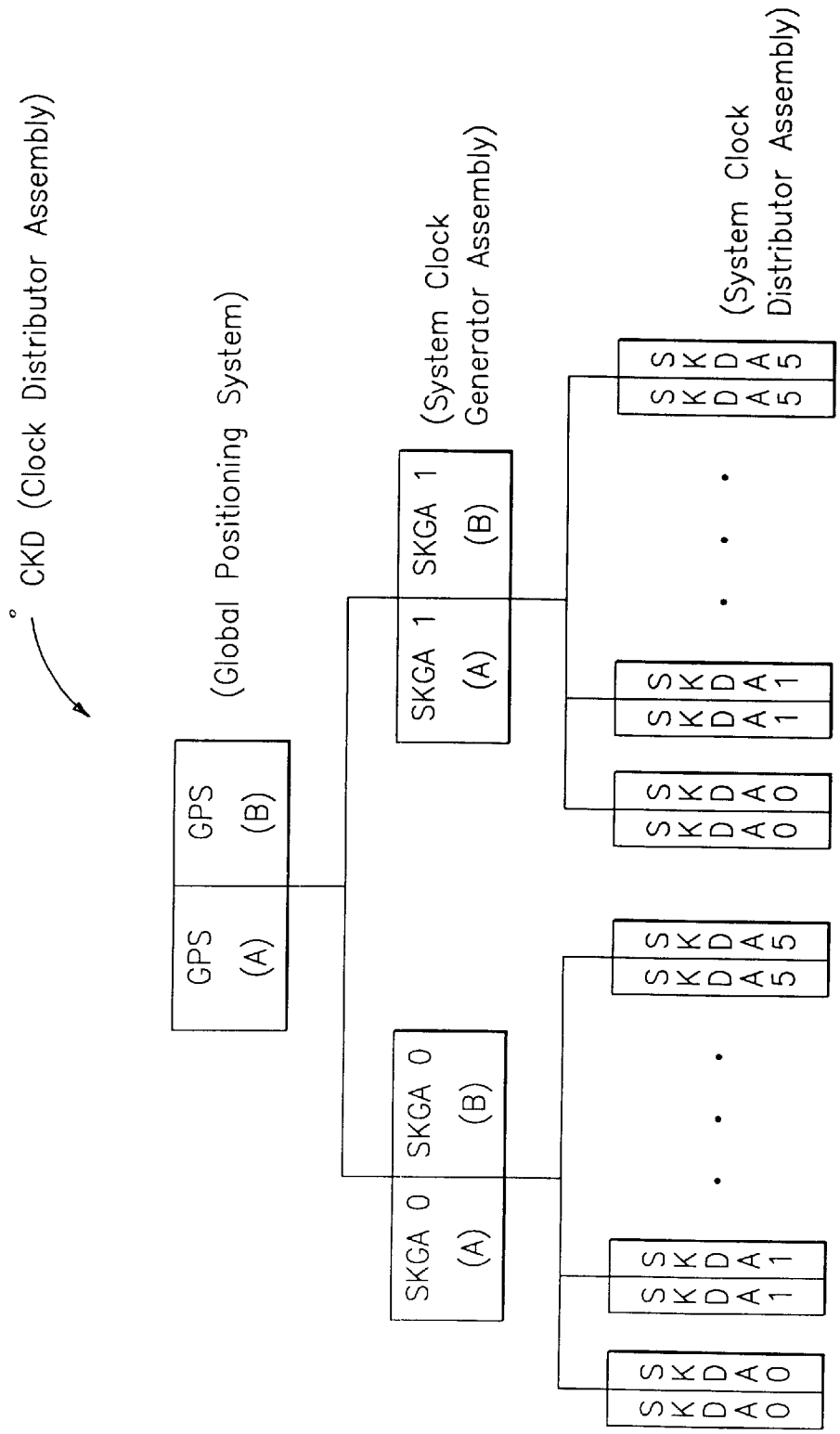
FIG. 1 is a block diagram of a common clock distributor.

A preferred embodiment of the present invention will be described in detail herein below with reference to the attached drawings, in which the like reference numerals represent the like elements. Further, it should be clearly understood that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 2:
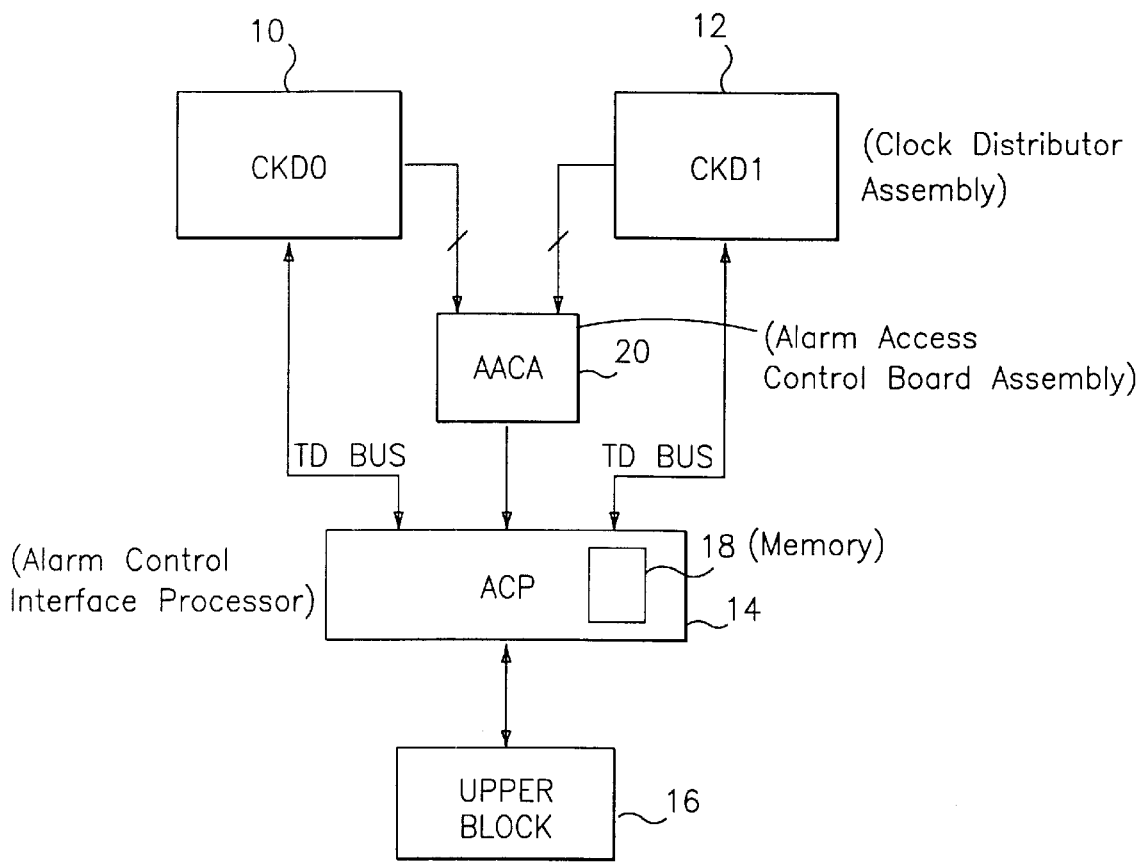
FIG. 2 is a block diagram of a device for managing a status of the clock distributor of FIG. 1 according to an embodiment of the present invention.

FIG. 2 illustrates a device for managing a status of a clock distributor CKD according to an embodiment of the present invention. The device includes an alarm control interface processor (ACP) 14 for managing status of first and second clock distributors (CKD0 and CKD1) 10 and 12, an upper block 16 for notifying an operator with the status management information from the alarm control interface processor 14, and an alarm access control board assembly (AACA) 20. The alarm access control board assembly 20 notifies the alarm control interface processor 14 whether respective boards in the first and second clock distributors 10 and 12 are installed or uninstalled. The alarm control interface processor 14 includes a memory 18. Further, a TD-bus is connected to interface signals between the alarm control interface processor 14 and the clock distributors 10 and 12.

Figure 3:
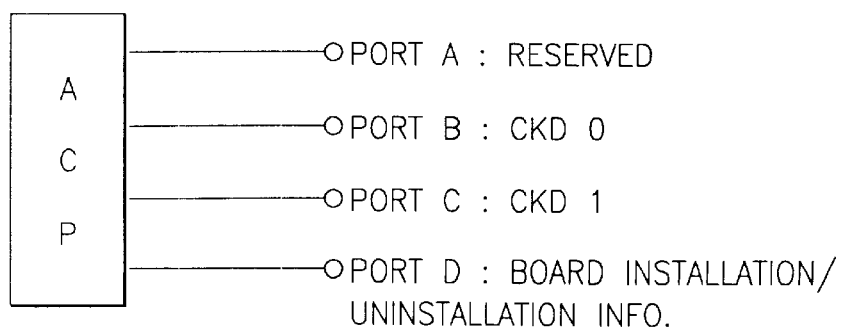
FIG. 3 is a diagram for showing an alarm control interface processor ACP with a plurality of TD-bus ports according to an embodiment of the present invention.

Referring to FIG. 3, the alarm control interface processor 14 allocates ports B and C to the TD-bus ports. The allocated TD-bus port B is to interface the first clock distributor (CKD0) 10, and the TD-bus port C is to interface the second clock distributor (CKD1) 12. With reference to FIG. 1, the first clock distributor 10 is composed of a global positioning system GSP(B), a pair of system clock generator assemblies SKGA1, and six pairs of system clock distributor assemblies SKDA0–SKDA5. The second clock distributor 12 is composed of a global positioning system GSP(A), a pair of system clock generator assemblies SKGA0, and six pairs of system clock distributor assemblies SKDA0–SKDA5. The alarm control interface processor 14 reads, via ports B and C, the status information of the respective boards in the first and second clock distributors 10 and 12, (i.e., monitors operational status and dual status of the respective boards). Further, the alarm control interface processor 14 includes a port D connected to the alarm access control board assembly 20. The alarm control interface processor 14 reads, via the port D, the installation/uninstallation information from the alarm access control board assembly 20.

FIG. 4 illustrates an address map programmed in the memory 18 of the alarm control interface processor 14 for interfacing the TD-bus via the TD-bus ports. As illustrated in the drawing, the memory 18 includes A, B, C, and D port regions, A, B, C and D port read regions, A, B, C and D port status regions, an A/B test region, a C/D test region, A, B, C and D mode selection regions, an interrupt mask region, a TD-bus selection (TD-bus port enable/disable) read regions, a TD-bus port selection region, an interrupt vector region, and a nonuse region. In addition, the memory 18 has a mode setting region for determining an operation mode in which the alarm control interface processor 14 accesses the TD-bus.

FIG. 5 illustrates functions of the TD-bus by operation modes, in which a mode 0 has a read after SKGA write function, a mode 1 has a SKGA status read function, a mode 2 has a SKGA dual status control function, a mode 4 has a read after SKDA write function, a mode 5 has a SKDA status read function, and a mode 6 has a SKDA dual status control function.

Figure 12:
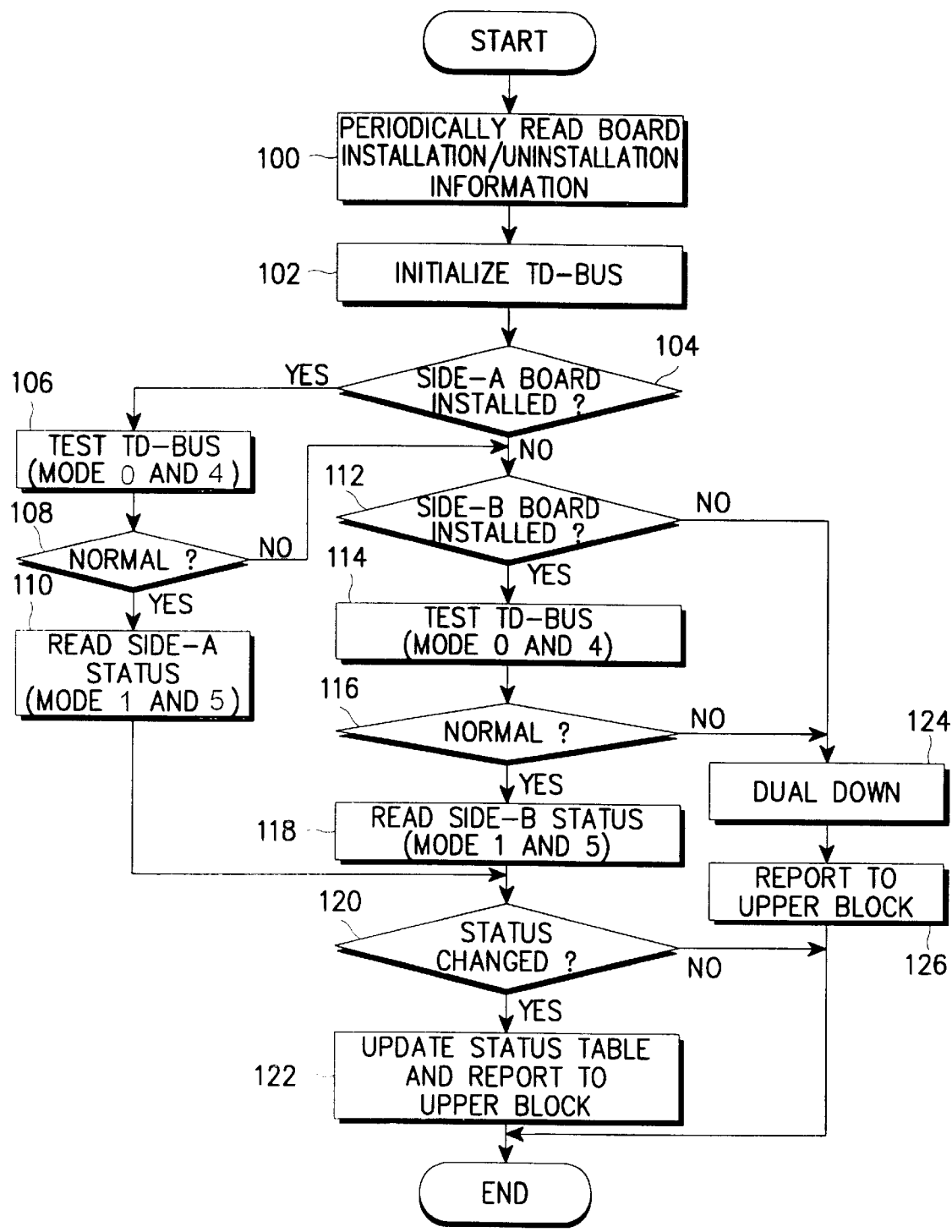
FIG. 12 is a flow chart for managing status and dual information of the clock distributor according to an embodiment of the present invention.

FIGS. 6 to 11 illustrate address and data bit status diagrams by the modes in case of accessing a device, in which FIG. 6 is a diagram for showing an address bit status for the mode 0, FIG. 7a is a diagram for showing an address bit status for the mode 1, FIG. 7b is a diagram for showing a data bit status for the mode 1, FIG. 8 is a diagram for showing an address bit status for the mode 2, FIG. 9 is a diagram for showing an address bit status for the mode 4, FIG. 10a is a diagram for showing an address bit status for the mode 5, FIG. 10b is a diagram for showing a data bit status for the mode 5, and FIG. 11 is a diagram for showing an address bit status for the mode 6. Further, FIG. 12 illustrates a flow chart for managing the status and dual information of the clock distributor CKD according to an embodiment of the present invention, in which a status management routine and a dual management routine of the clock distributor CKD are periodically executed.

Referring now to FIGS. 2 to 12, if the boards are installed or uninstalled in/from the first and second clock distributors 10 and 12, respectively, the alarm access control board assembly 20 connected to all the boards in the first and second clock distributors 10 and 12, sets the installation/uninstallation information of the associated boards. Then, at a step 100 of FIG. 12, the alarm control interface processor 14 periodically reads via the port D the installation/uninstallation information of the respective boards that the alarm access control board assembly 20 has set.

Then, at a step 102, the alarm control interface processor 14 initializes the TD-bus. The alarm control interface processor 14 checks at a step 104, via the port D, whether a side-A board out of the dual boards in the first and second clock distributors 10 and 12 is installed or not. If the side-A board is uninstalled, it is checked at a step 112 whether or not the a side-B board is installed. If the side-A and side-B boards are all uninstalled, the alarm control interface processor 14 recognizes a dual down at a step 124, and report the dual down status to the upper block 16 at a step 126.

However, if the side-A board is installed at the step 104, the procedure goes to a step 106 and checks out whether the TD-bus communication is normal to read the status information of the side-A board. The checking is performed by using the address bit status information for mode 0 and mode 4 as shown in FIGS. 6 and 9. That is, the checking is performed by writing and reading test data into/from the registers of the SKGA and SKDA0–SKDA5 of the side-A board in the first and second clock distributors 10 and 12. Thereafter, the alarm control interface processor 14 checks at a step 108 whether the TD-bus communication is normal. If the TD-bus communication is normal, the alarm control interface processor 14 reads status information of the respective boards of the side-A (e.g., normal/abnormal status information, operation/waiting status information of the respective boards, and information generated in case of a switching due to an abnormality of the operating party) at step 110. The alarm control interface processor 14 then reads the status information of the side-A board by using the address and data bit status for mode 1 and mode 5 as shown in FIGS. 7a, 7b, 10a, and 10b. That is, the alarm control interface processor 14 reads the normal/abnormal status and operation/waiting status for SKGA and SKDA0–SKDA5 of the side-A boards in the first and second clock distributors 10 and 12.

In the meantime, in case that the side-A board is uninstalled and the side-B board is installed, the alarm control interface processor 14 executes steps 114 to 118 which are similar to the steps 106 to 110. By way of the steps 114 to 118, the alarm control interface processor 14 reads the normal/abnormal status information and operation/waiting status information for SKGA and SKDA0–SKDA5 of the side-B boards in the first and second clock distributors 10 and 12.

If the TD-bus communication is not normal at the step 108, the procedure goes to the step 112. Further, if the TD-bus communication is not normal at the step 116, the alarm control interface processor 14 goes to the step 124 to recognize the dual down. Thereafter, the alarm control interface processor 14 reports the status to the upper block 16 at the step 126.

After the steps 110 and 118, the alarm control interface processor 14 checks at step 120 whether or not the status information has been changed. If the status information is changed, the alarm control interface processor 14 updates the status tables and reports the updated status table information to the upper block 16, at a step 122. Then, the upper block 16 notifies the operator of the reported information.

Since the SKGA and SKDA are all dualized, it is possible to know the status and dual information, for example, of the side-B board, by simply reading the registers of the side-A board. That is, the alarm control interface processor 14 may read the status information of the clock distributors 10 and 12 by selectively executing the steps 104–110 or the steps 112–118.

For example, in case that the alarm control interface processor accesses the side-A board in the clock distributor which is uninstalled or abnormal, the TD-bus error may be generated and the alarm control interface processor may read the error data. Therefore, in order to prevent the misoperation, prior to the status read of the respective sides (the steps 110 and 118), the alarm control interface processor checks the installation of the respective boards (the step 100), and checks the normality of the TD-bus communication (the steps 106 and 114).

As can be appreciated from the foregoing descriptions, the present invention forms a TD-bus communication path and notifies the operator with the status information (i.e., installation/uninstallation status, and operation/waiting status information) and dual information of the respective boards via the TD-bus. Therefore, the operator may effectively manage the status and dual information of the respective boards in the clock distributor of the base station controller.

Although a preferred embodiment of the present invention has been described in detail herein above, it should be clearly understood that many variations and/or modifications of the basic inventive concepts herein taught which may appear to those skilled in the art will still fall within the spirit and scope of the present invention as defined in the appended claims.

What is claimed is:

1. A method for managing status of boards in a clock distributor for use in a CDMA (Code Division Multiple Access) base station controller, comprising the steps of:
    forming a TD-Bus communication path and an address map for a TD-Bus communication;
    establishing TD-Bus communications and using said address map to check whether the TD-Bus is functioning normally and to check the status of at least one of the boards in said clock distributor; and
    updating preregistered status information and reporting the updated status information to an upper block in the base station when the status of at least one board is changed.

2. The method according to claim 1, wherein said address map includes regions for checking function abnormality and dual status of the respective boards in said clock distributor.

3. A method for managing status of boards in a clock distributor for use in a CDMA base station controller, comprising the steps of:
    forming a TD-bus communication path between the clock distributor and an alarm control interface processor;
    forming an address map in a memory contained within the alarm control interface processor for establishing TD-bus communication;
    periodically checking whether the TD-bus is functioning normally and checking the status of at least one of the boards in said clock distributor; and
    reporting changed status information to an upper block in the base station controller.

4. The method according to claim 3, wherein the formed address map includes regions for checking function abnormality and dual status of the respective boards in said clock distributor.

5. A method for managing status of boards in a clock distributor for use in a CDMA (Code Division Multiple Access) base station controller, comprising the steps of:
    reading information from the clock distributor relating to board installation or uninstallation;
    initializing a TD-Bus communication path between the clock distributor and an alarm control interface;
    determining the installation status of the boards in the clock distributor;
    testing the TD-Bus communication when a board is installed;
    determining the status of any installed board;
    updating a status table when the status of any installed board has changed; and
    reporting the determined status change to an upper block in the base station controller.

6. The method according to claim 5, further comprising the steps of:
    executing a dual down status mode when no boards are installed in the clock distributor; and
    reporting the dual down status to the upper block in the base station controller.

7. The method according to claim 5, wherein said step of testing the TD-bus communication is performed on a first side of the clock distributor when a board is installed in said first side.

8. The method according to claim 7, wherein said step of testing the TD-bus is performed on a second side of the clock distributor when no board is installed in the first side.

9. The method according to claim 7, wherein said step of testing the TD-bus is performed on a second side of the clock distributor when TD-bus communication in the board installed in the first side is determined to be abnormal.

10. The method according to claim 7, further comprising the steps of:
    executing a dual down status mode when TD-bus communication in a board installed in the second side is determined to be abnormal; and
    reporting the dual down status to the upper block in the base station controller.

11. The method according to claim 1 including checking whether at least one board in said clock distributor is installed.

12. The method according to claim 1, wherein the check of whether at least one of the boards is functioning normally includes checking status information of at least one of two boards in said clock distributor.

13. The method according to claim 3, including checking whether at least one board in said clock distributor is installed.

14. The method according to claim 3, wherein the step of checking whether at least one of the boards is functioning normally includes checking status information of at least one of two boards in said clock distributor.

15. The method according to claim 5, wherein the step of determining the installation status of the boards in the clock distributor includes determining whether at least one of two boards in the clock distributor is installed.

* * * * *